June 19, 1934.                E. J. FARKAS                1,963,654
                             SHOCK ABSORBER
                            Filed April 8, 1932
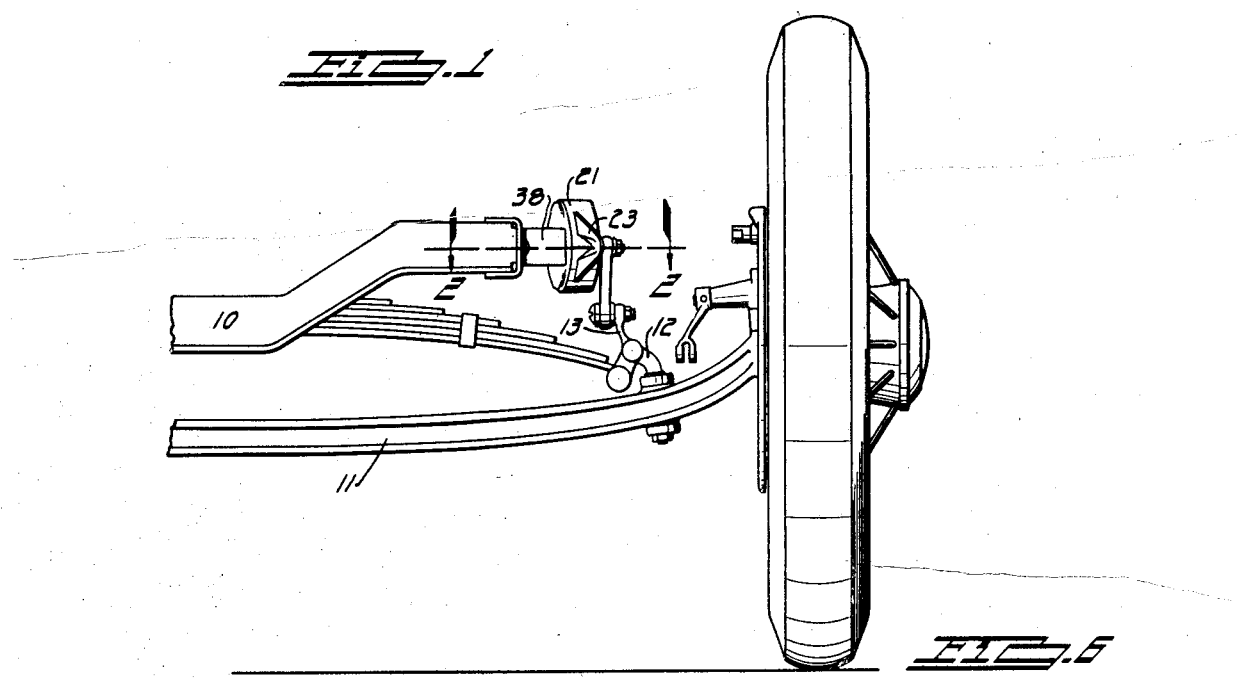
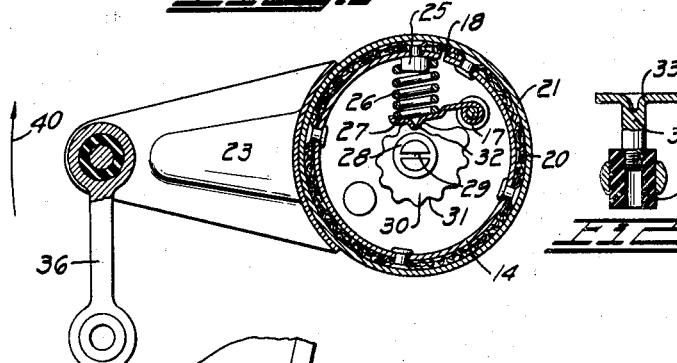
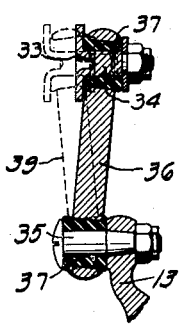
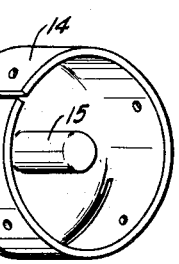
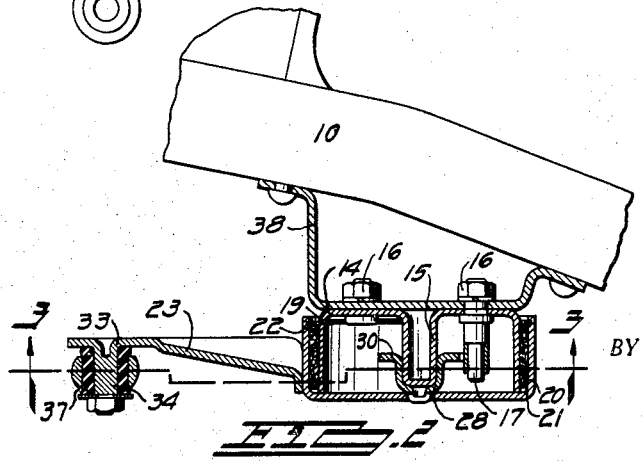
INVENTOR.
E. J. Farkas
BY
ATTORNEY.

Patented June 19, 1934

1,963,654

UNITED STATES PATENT OFFICE 1,963,654

SHOCK ABSORBER

Eugene J. Farkas, Detroit, Mich., assignor to Ford Motor Company, Dearborn, Mich., a corporation of Delaware Application April 8, 1932, Serial No. 604,021

8 Claims. (Cl. 188—130)

The object of my invention is to provide a shock absorber of simple, durable and inexpensive construction.

A further object of my invention is to provide a friction type of shock absorber which will simulate the well known rotary vane type hydraulic shock absorber, both in appearance and in function, and which may be connected to an automobile chassis in a like manner.

Heretofore, most friction shock absorbers have been single acting devices capable of resisting movement in one direction only. There have, however, been friction type shock absorbers produced which resist movement equally in both directions, but all of these, to the applicant's knowledge, are defective in that the resistance offered to movement in one direction is substantially the same as the resistance offered to movement in the opposite direction.

This defect the rotary vane type shock absorber has overcome by providing a fixed ratio between the resistance offered for movement in each direction so that just the right restriction is placed upon impact loads and a larger but predetermined resistance offered against rebound resulting from these impact loads. Further, the device is made adjustable but still this ratio is maintained over the full range of adjustment. It is believed that only with hydraulic type shock absorbers has it been possible to obtain all of these desirable features. It is the purpose of this invention to provide a friction type device which will maintain a predetermined ratio of resistance to movement in both directions and to provide an adjustment on this device which will maintain this ratio over its full range.

A feature of special importance in connection with this device is that substantially all the parts of this shock absorber installation are formed from sheet metal stampings so that an inexpensive device results. It is apparent that my device does not require any of the expensive machine operations invariably associated with hydraulic shock absorbers and that failure of the device from wear is practically eliminated.

A further object of my invention is to provide a novel shock absorber link whereby the shock absorber is secured to the vehicle axle. It is well known that the vehicle frame must be permitted to sway through a limited degree relative to the axle; consequently, the link which connects the shock absorber arm to the axle has heretofore been provided with universal fittings or ball joints so that this sway may be compensated for. A disadvantage of such ball joints is that they must be lubricated often to prevent wear which would cause the parts to rattle. In my device, I provide an annular ring of rubber placed under compression between each end of the link and the adjacent shock absorber arm or axle, which device is so constructed that the rubber thereof will flex torsionally when the shock absorber oscillates and which will compensate for side sway by compression and tension in the annular ring. This ring of rubber being under compression when in position insures that there will be no sliding action between the ring and adjacent members so that all compensatioin will be accomplished by distortion in the rubber itself.

With these and other objects in view, my invention consists in the arrangement, construction and combination of the various parts of my improved device, as described in this specification, claimed in my claims, and illustrated in the accompanying drawing, in which:

Figure 1 shows a front elevation of the left hand front portion of a vehicle chassis having my improved shock absorber installed thereon.

Figure 2 shows a horizontal sectional view, taken through the shock absorber shown in Figure 1.

Figure 3 shows a sectional view, taken on the line 3—3 of Figure 2.

Figure 4 shows a perspective view of the stationary friction band retaining portion of my shock absorber.

Figure 5 shows the method of assembling the shock absorber link, and

Figure 6 illustrates the means for compensating for deflection incurred when the car sways from side to side.

Referring to the drawing and in particular to Figure 1, I have shown my improved shock absorber installed between the frame and the front axle of a vehicle; however, it will be readily understood that the device may, in the same manner, be installed between the frame and the rear axle of the vehicle and in fact, a complete installation of these shock absorbers consists of four units, one installed between each end of each axle and the adjacent portion of the vehicle frame. The vehicle frame in this drawing is designated by the numeral 10, while the axle is marked 11. A spring perch 12 is secured on the axle and an arm 13 projects upwardly from this perch to which the oscillating arm of my shock absorber is secured.

I have provided a sheet metal U-shaped bracket 38 which is riveted to one of the side members of the frame 10, which is adapted to secure my shock absorber in position. The shock absorber unit consists of a cup-shaped drum 14, illustrated in Figure 4, this member being formed as a sheet metal stamping having an axial sleeve 15 drawn from the material of the bottom of the cup, which sleeve is axially aligned with the rim of the drum. The web of the drum is secured to the bracket 38 by a pair of bolts 16, one of these bolts having a pin 17 projecting from the head thereof, the purpose of which will later be described.

As will be seen from Figure 4, the stationary drum 14 is provided with a slot 18 extending axially through the rim portion thereof and the second slot 19 extends from the bottom of the slot 18 circumferentially halfway around the drum, thus partially separating the rim from the web so as to form a tongue 24 which is permitted a limited radial flexing movement to thereby alter the effective circumferential dimension of the drum. A section of brake lining 20 is riveted around the periphery of the stationary drum 14, as shown in Figure 3 and an oscillating drum 21 is placed over the lining 20. In order that the drum 21 may be held in position, I have provided a snap ring 22 which is resiliently secured in a suitable internal groove formed in the inner edge of the drum 21 which ring bears against the inside edge of the brake lining and prevents the removal of the drum. A sheet metal arm 23 is welded to the rim of the drum 21 and extends radially therefrom so that oscillation of the arm 23 oscillates the drum 21 around the stationary lining 20.

Now in order that the desired friction may be provided between the lining 20 and the drum 21, I have provided what is believed to be a unique adjusting device consisting of means for adjustably resiliently urging the free end of the tongue 24 outwardly against the brake drum 21. It will be noted from Figure 3, that the particular rivet used to secure the brake lining to the free end of the tongue 24 is provided with an enlarged head 25 which serves as a pilot for a compression spring 26, this spring extending inwardly toward the axis of the drum. The inner end of this spring is anchored on a sheet metal spring seat 27, this seat being pivotally secured to the web of the drum 14 by the pin 17. The spring 26 may thereby be flexed by oscillating the spring seat 27 around the pin 17.

In order to vary the pressure of the spring 26 on the tongue 24, I have provided an adjusting cam comprising a sleeve-like member 28 which is rotatably mounted on the outer end of the sleeve 15 and which extends through a suitable axle opening in the drum 21. The protruding end of the sleeve 28 is provided with a slot 29 therein whereby the sleeve 28 may be rotated with a screw driver or the like. It will be noted that the inner end of the sleeve 28 extends to a central position in the shock absorber and that a cam 30 is formed integrally with this end of the sleeve, the whole being formed as a sheet metal stamping. The periphery of the cam 30 is provided with a plurality of notches 31 and the adjacent side of the spring seat 27 is provided with a detent 32 which is resiliently urged by the spring 26 into the notches 31.

From the foregoing it will be seen that when the device is in the position shown by Figure 3, the inner end of the spring 26 is positioned relatively close to the axis of the shock absorber and that by rotating the cam 30 in a clockwise direction, the spring may be compressed to exert a relatively heavy pressure against the free end of the tongue 24. Of course, the provision of notches in the cam 30 makes it unnecessary to provide any other locking means to hold the cam in any one of its numerous positions.

The effect of the spring 26 is to force the free end of the tongue 24 and adjacent portion of the brake lining outwardly against the drum 21 to thereby frictionally resist rotation of this drum. When the arm 23 is rotated in the direction shown by the arrow 40, a comparatively small resistance is offered to the movement thereof, but when the arm is moved in the direction oppositely to this arrow then this movement is resisted by a much heavier force. The ratio of the resistance produced by these two movements may be fixed at the desired amount by lengthening or decreasing the length of the slot 19, the greater the length of the slot the greater the difference in frictional resistance offered to movement in each direction. This device is similar to what is known as an energized brake wherein the drag produced by the drums helps to force the lining into more intimate contact therewith.

The purpose of the adjusting cam 30 is to compensate for both wear on the brake lining and for variations of the coefficient of friction of the lining, due to the condition of its surface and the operating temperature of the lining. Adjustment of the cam does not alter the ratio of the resistance to movement in the two directions of the arm 23 inasmuch as this ratio is fixed by the length of the slot 19 and when once established cannot be altered by the adjustment. Thus, a shock absorber is provided which will offer the desired resistance to compression of the vehicle spring and at the same time will offer a predetermined increased resistance to the rebounding thereof and which two shock absorber actions may be readily altered by a single adjustment.

The mounting which I have provided for securing the outer end of the arm 23 to the axle 11 is believed to be of novel construction. A relatively short sleeve 33 is drawn from the material of the free end of the arm 23 and a pin 34 is butt welded thereto, the welded end of this pin being drilled to maintain the same cross section for the pin as for the sleeve 33. The spring perch arm 13 is provided with a screw 35 in its top end and a link 36 having an eye at each end thereof extends between the screw 35 and pin 34. The eyes of this link are materially larger than either the pin or screw so that an annular ring of rubber 37 may be inserted therebetween. The method whereby the rubber ring 37 is installed in position is somewhat unique in that the rubber ring is vulcanized with a bore considerably smaller than the diameter of the pin or screw and having its exterior proportioned so as to just fit in an eye of the link. The ring is inserted in the eye of the link and is then pressed over the pin with sufficient pressure to compress the rubber thereby placing the rubber ring under compression. A nut is then screwed down over the outer face of the rubber ring to keep the device in position. Sufficient surface friction is developed between the ring and the pin and eye so that oscillation of the link around the pin through a considerable degree is resisted solely by distortion of the rubber there being no sliding action between the rubber and the pin over the normal movement. Further, when the car sways sideways the rubber rings are distorted, as shown by dotted lines 39 in Figure 6, but upon return of the vehicle the rings resume their normal shape.

It will be readily seen that with this installation no lubrication of any description is required for the shock absorbers or connections thereto. This one feature makes this device superior from a service standpoint to hydraulic and most types of friction shock absorbers which require replenishing the fluid therein or the lubrication of the joints in the operating mechanism thereof.

The most important advantage obtained with this device from a commercial standpoint is that substantially all the parts thereof are formed as relatively inexpensive sheet metal stampings which need not be held to close limits so that a very inexpensive product is assured.

Some changes may be made in the arrangement, construction and combination of the various parts of my improved device without departing from the spirit of my invention and it is my intention to cover by my claims such changes as may reasonably be included within the scope thereof.

I claim as my invention:

1. A vehicle shock absorber comprising a pair of cylindrical drums arranged so that one encircles the other, one of said drums being secured to the vehicle frame and the other to the vehicle axle whereby relative movement therebetween causes relative oscillation of said drums, the periphery of the inner of said drums being slotted therethrough so as to be readily circumferentially expansible, a friction lining disposed between said drums, an adjusting cam axially disposed within said drums, and a compression spring disposed between said cam and portion of the inner drum adjacent to said slot, whereby the circumferential expansion of said expansible drum may be adjusted by said cam.

2. A shock absorber comprising a pair of cup-shaped cylindrical drums having the open end of one inserted into the open end of the other, a friction lining disposed between the overlapping portions of said drums, one of said drums having a circumferential slot therein separating substantially half of its rim portion from its web and having one end of said slot continuing axially through the rim portion to form a peripheral tongue thereon, and means for resiliently urging said tongue into contact with said brake lining to thereby vary the resistance offered by said shock absorber.

3. A shock absorber comprising a pair of cup-shaped cylindrical drums having the open end of one inserted into the open end of the other so that their rim portions overlap, the inner of said drums having a circumferential slot therein separating substantially half of its rim portion from its web and having one end of said slot continuing axially through the rim portion to thereby form a peripheral tongue thereon, a friction lining disposed around said tongue and remaining portion of said rim, and means for resiliently urging the free end of said tongue outwardly to increase the frictional resistance between said drums.

4. A shock absorber comprising a pair of cup-shaped cylindrical drums having the open end of one inserted into the open end of the other so that their rim portions overlap, the inner of said drums having a circumferential slot therein separating substantially half of its rim portion from its web and having one end of said slot continuing axially through the rim portion to thereby form a peripheral tongue thereon, an axially disposed cam rotatably mounted in the enclosure formed by said drums, and a compression spring disposed between said cam and the free end of said tongue whereby adjustment of said cam alters the effective pressure of said spring to thereby alter the friction produced between said drums.

5. A vehicle shock absorber comprising a pair of cup-shaped cylindrical drums having the open end of one inserted into the open end of the other so that their rim portions overlap, means for securing the web portion of the inner of said drums to the vehicle frame, means for connecting the other of said drums to the vehicle axle whereby movement of the axle causes relative rotation between said drums, said inner drum having a circumferential slot therein separating substantially half of its rim portion from its web and having one end of said slot continuing axially through the rim portion to thereby form a peripheral tongue thereon, a friction lining secured to said tongue and remaining portion of said inner rim so as to substantially fill the space between said drums, an adjustable cam disposed within the enclosure formed by said drums, and a spring disposed between said cam and the free end of said tongue whereby adjusting said cam will alter the resistance of said shock absorber.

6. A shock absorber comprising a pair of sheet metal cup-shaped cylindrical drums having the open end of one inserted into the open end of the other so that their rim portions overlap, the inner of said drums having a circumferential slot therein separating substantially half of its rim portion from its web and having one end of said slot continuing axially through the rim portion to thereby form a peripheral tongue on said inner drum, a section of brake lining secured around the periphery of said tongue and remaining portion of said inner rim substantially filling the space between said drums, an adjustable cam rotatably mounted in the enclosure formed by said drums having its cam surface notched, a spring seat disposed within said drums adapted to engage said notches, and a spring disposed between said seat and the free end of said tongue, to thereby resiliently urge said tongue into contact with said outer drum.

7. A shock absorber comprising a pair of cup-shaped cylindrical drums having the open end of one inserted into the open end of the other so that their rim portions overlap, a ring of brake lining disposed between said overlapping portions and secured to one of said rims, and a snap ring detachably secured in a suitable groove in the other of said rims adapted to butt up against the inner edge of said lining and thus prevent the unauthorized separation of said drums.

8. A shock absorber comprising a pair of cup-shaped drums having the open end of one inserted into the open end of the other so that their rim portions overlap, a section of brake lining disposed between said overlapping portions and secured to the periphery of said inner drum, and a snap ring detachably secured in a suitable groove in the inner periphery of the outer of said drums, said ring butting against the inner edge of said lining upon the unauthorized attempt to separate said drums.

EUGENE J. FARKAS.